(12) United States Patent
Jones

(10) Patent No.: US 7,000,759 B1
(45) Date of Patent: Feb. 21, 2006

(54) CONVEYOR CONVERSION KIT FOR REPLACING ROLLERS WITHIN A CONVEYOR SYSTEM AND METHOD

(76) Inventor: William Devere Jones, 11048 W. 55th Pl., Arvada, CO (US) 80002

( * ) Notice: Subject to any disclaimer, the term of this patent is extended or adjusted under 35 U.S.C. 154(b) by 0 days.

(21) Appl. No.: 10/723,481

(22) Filed: Nov. 26, 2003

Related U.S. Application Data

(60) Provisional application No. 60/429,491, filed on Nov. 29, 2002.

(51) Int. Cl.
*B65G 15/60* (2006.01)

(52) U.S. Cl. ............ 198/841; 198/615; 198/860.1
(58) Field of Classification Search ........ 198/615, 198/841, 860.1
See application file for complete search history.

(56) References Cited

U.S. PATENT DOCUMENTS

| | | | | |
|---|---|---|---|---|
| 3,200,940 A | * | 8/1965 | Higgins | 198/827 |
| 3,605,994 A | * | 9/1971 | Parlette | 198/861.1 |
| 4,215,776 A | * | 8/1980 | Esler | 198/823 |
| 4,359,156 A | * | 11/1982 | Austin | 198/841 |
| 4,518,303 A | * | 5/1985 | Moser | 414/528 |
| 4,650,067 A | * | 3/1987 | Brule | 198/841 |
| 4,724,953 A | * | 2/1988 | Winchester | 198/836.3 |
| 4,789,056 A | * | 12/1988 | Bourbeau | 198/823 |
| 5,593,019 A | * | 1/1997 | Schlagel | 198/721 |
| 5,601,180 A | * | 2/1997 | Steeber et al. | 198/502.1 |
| 5,692,597 A | * | 12/1997 | Ferguson | 198/841 |
| 6,269,939 B1 | * | 8/2001 | Lapeyre et al. | 198/615 |
| 6,640,966 B1 | * | 11/2003 | Reatti | 198/841 |

\* cited by examiner

*Primary Examiner*—Gene O. Crawford
*Assistant Examiner*—Mark A. Deuble
(74) *Attorney, Agent, or Firm*—Barber Legal; Craig Barber

(57) ABSTRACT

An endless loop belt conveyor system that is free of rollers is produced from a roller conveyor or a powered endless belt roller conveyor using a conversion kit. The conversion kit includes at least one endless loop belt conveyor guide; and at least two conveyor guide mounts. In addition, the conversion kit may include a motor driven roller section and an idler roller section both designed to be dropped in at the head portion or at the tail portion of a frame. The resulting converted conveyor system, and also the method of removing and replacing roller conveyors to convert the conveyor system to an endless belt conveyor that is free of rollers is taught.

20 Claims, 3 Drawing Sheets

CONVEYOR CONVERSION KIT FOR REPLACING ROLLERS WITHIN A CONVEYOR SYSTEM AND METHOD

RELATED APPLICATION

The present application claims the benefit under title 35 United States Code, Section ii 9(e) of U.S. provisional application No. 60/429,491 filed Nov. 29, 2002 entitled "CONVEYOR SYSTEM AND CONVEYOR CONVERSION KIT FOR REPLACING POWERED ROLLERS WITHIN A CONVEYOR SYSTEM".

BACKGROUND OF THE INVENTION

1. Field of the Invention

The present invention relates generally to convertible conveyor systems, and more particularly it relates to a conveyor conversion kit for replacing rollers within a roller conveyor system or within a roller supported belt system with an elongated smooth supporting surface for a motor powered endless belt. It also relates to the resulting converted conveyor system, and also to the method of replacing roller conveyors to convert the conveyor system to a motor powered endless belt conveyor.

2. Description of the Prior Art

Roller conveyors are commonly used to provide a conveying surface for a variety of items. Typical roller conveyors include a pair of parallel side walls, or beams, or side rails or rails joined by a series of spaced apart connector bars to form a rigid frame. In between the parallel side walls a plurality of spaced cylindrical rollers are supported. The topmost portions of the rollers define a conveying plane on which to-be-conveyed items are placed and rolled.

To meet changing conveying demands, motor-driven or powered endless belt roller conveyors are often used. Because the rollers in existing conveyors were already in place, it was common practice to use as many of the existing rollers as possible to support a powered endless belt. That is, an endless belt was merely installed on a roller conveyor frame with the rollers acting as the primary supports for the top of the movable endless belt. Typically, such endless belt powered conveyor systems still included the rigid frame formed from a pair of parallel side walls joined by a series of spaced apart connector bars, with the parallel side walls still carrying a plurality of spaced rollers to, as noted above, supports for the top of a movable endless belt.

Typically, an endless belt conveyor is driven linearly between the side walls of the frame by one or more motorized drive roller. The motorized drive roller is located and connected at one or more point along its length of the endless belt conveyor, but is most generally located in about the center of the conveyor system, but may be connected at the head or at the tail, i.e. the beginning or end, of the conveyor frame. In the latter arrangement, the top of the movable endless belt is supported on the top the rollers and drive roller, or when so located, wraps around a head or a tail drive roller. At the same time the bottom of the movable endless belt is generally guided by idler or return rollers.

It is noted, that in practice these idler or return rollers often extend below the support frame structures and are sufficiently out in the open to pose various potential hazards. The exposed idlers or return rollers may pose a significant pinching hazard to workers, or may catch loose materials or a worker's clothing or appendages between themselves and the endless belt. These hazards are more pronounced where the idlers or rollers are in close proximity to a work station area at which location the attention of a worker may be focused on performing a particular task, and therefore distracted from safety considerations. In addition, in an operation in which a conveyor belt moves significant amounts of loose material, such loose materials may adhere to the endless belt and accumulate at critical locations along the endless belt track, thereby subjecting the system to significant additional wear and tear, and premature failure. In addition, it is not unusual for substantial noise to be generated by the rollers and by the endless belt bouncing up and down on the rollers. Furthermore, over time, individual support rollers may become worn or otherwise become damaged and need replacement. Replacing individual support roller is not only expensive, but is time consuming and labor intensive, and also requires that the conveyor system to be inoperative during the replacement of the roller, thereby resulting in down time with the non-productive interruption of movement of conveyed items on the conveyor system.

It is noted that in the known prior parent art, Lapeyre, et al., U.S. Pat. No. 6,269,939 teaches a conversion kit and a method for converting a roller conveyor into a belt conveyor. The converted conveyor is made from a roller conveyor that has a frame with two parallel sides supporting a set of parallel rollers at spaced apart locations. A conversion kit that includes attachment collars that fit around spaced apart selected rollers, while leaving the rollers in place. So called wearstrip material extends outward from the attachment collars and overlies groups of consecutive rollers. The wearstrip material and the collars resting on the rollers form a bed between the sidewalls on which a conveyor belt is supported. However, the resulting converted belt conveyor has the shortcomings that the rollers remaining on the frame tend to catch dirt, dust and debris, and include the possibility of becoming dislodged and falling onto the return portion of the endless belt, thereby posing the possibility of damaging the belt or other parts of the system. It is therefore clearly seen that there is a need for a simple, quick and inexpensive way to convert a roller conveyor into a motor-driven endless belt conveyor that is substantially free of rollers.

In Reatti., U.S. Pat. No. 6,640,966, a support structure for the return section of a belt conveyor, is taught. The support structure is comprised of serpentine slat elements, support members for supporting the serpentine elements, and transverse members to which the support members are coupled. Each serpentine slat element is supported independently of the others by its own independent support members. The support members include on their lower edge, mechanisms for snap-coupling them to the transverse members; the snap-coupling mechanisms being formed in a manner that enables the support members to be coupled by pressing them onto the transverse members. The serpentine slat elements extend between the sidewalls of the return section of a belt conveyor. While this reference does not teach a method for converting a roller conveyor into a belt conveyor, it does teach a return section of a conveyor that is free of rollers. However, the resulting return section of a conveyor has the short comings that it is limited to use at the return section of a conveyor.

Accordingly, there exists a need to provide a conveyor conversion kit for replacing substantially all existing support rollers within a roller conveyor system or within a roller supported belt system with an elongated smooth belt supporting surface for a powered endless belt conveyor. As detailed below, the preferred support roller replacement system of the present invention provides a conveyor conversion kit including modular drop-in style cross supports for such elongated smooth belt supporting surfaces. It also teaches such cross supports with appropriately modified compatible return rollers. It also teaches drop-in drive head and tail motors, and more, as detailed below. It also teaches the resulting converted conveyor system, and also teaches the method of replacing roller conveyors to convert the conveyor system to a motor powered endless belt conveyor.

SUMMARY OF THE INVENTION

It is therefor an object of the present invention to provide a conveyor conversion kit for replacing substantially all existing support rollers within a roller conveyor system or within a roller supported belt system with an elongated smooth belt supporting surface for a powered endless belt conveyor.

It is a further object of the present invention to provide a conveyor conversion kit including modular drop-in cross supports for elongated smooth belt supporting surfaces.

It is another object of the present invention to teach such cross supports with appropriately modified compatible return rollers.

It is yet another object of the present invention to teach drop-in drive head and tail motors.

It is another object of the present invention to teach the resulting converted conveyor systems.

It is another object of the present invention to teach the method of replacing roller conveyors to convert the conveyor system to a motor powered endless belt conveyor.

As noted above, roller conveyors are used to provide a conveying surface for a variety of items. To meet changing demands, motor-driven or powered endless belt conveyors are often used. In both conveyor systems rollers are used to support conveyed items or a powered endless belt, sometimes referred to as a "chain". Both such conveyor systems, and others include a rigid frame formed from a pair of parallel side walls joined by a series of spaced apart connector bars, with the parallel side walls carrying a plurality of spaced rollers to, as noted above, supports for the top of a movable endless belt. A motorized drive roller is located at and connected at one or more point along its length of the endless belt conveyor, but is most generally located in about the center of the conveyor system, but may be connected at the head or at the tail, i.e. the beginning or end, of the conveyor frame. In this arrangement, the top of the movable endless belt is supported on the top the rollers and the bottom of the movable endless belt is generally unsupported.

In the practice of present invention, an endless loop belt conveyor system is produced from a roller conveyor or a powered endless belt roller conveyor using the conversion kit of the present invention. It is noted that in such conveyor systems the parallel side walls have a distance between them. The conversion kit includes at least one endless loop belt conveyor guide, and at least two conveyor guide mounts, both as described and defined herein.

In preferred embodiments, the endless loop belt conveyor guide is is substantially linear and substantially flat. The belt conveyor guide includes a smooth, non-moving upper surface designed to support and guide an endless loop belt for movement around the conveyor system without the need for rollers. The belt conveyor guide is preferably made of or coated with a smooth hard polymer; such as acetyl, polyethylene, high density polyethylene, nylon or the like; although wood, ceramic or metal materials may be used for the same purpose. Each endless loop belt conveyor guide may be of any length, so long as it can span the distance between two conveyor guide mounts, although a single endless loop belt conveyor guide having a length that extends between the head and tail of the frame is preferred. It is noted that in each conveyor systems the parallel side walls of the frame have a finite distance between them. Each endless loop belt conveyor guide has a width dimension, said loop belt conveyor guide width dimension being less than the distance between a pair of generally parallel side walls of a conveyor frame, and the endless loop belt conveyor guide is not connected to the side walls of the conveyor frame. In the alternative, and as the preferred embodiment, the endless loop belt conveyor guides may include two or more adjacent belt conveyor guides.

The conveyor guide mounts are designed to be supported in spaced apart relation by attachment to the pair of generally parallel side walls of the conveyor frame. Any two or more conveyor guide mounts are suitable to supporting a loop belt conveyor guide. Each conveyor guide mount include an upper yoke portion having a width dimension substantially the same as the distance between the pair of parallel side walls of the conveyor frame, the yoke portion being designed to be connected to and be supported by the parallel side walls of the conveyor frame. Each conveyor guide mount includes a U-shaped frame connected to and supported by and below said upper yoke portion. Each U-shaped frame portion of said conveyor guide mount includes a freely rotatable return roller for supporting and guiding the return portion of an endless loop conveyor belt.

As noted above, substantially all of the rollers are removed from the rigid frame. This allows a motor driven roller, as part of the conversion kit, to be dropped in at the head portion or at the tail portion of the frame. Similarly, this also allows an idler roller, as part of the conversion kit, to be dropped in at the opposed tail portion or head portion of the frame.

In the practice of the present invention, the conversion kit for converting a roller conveyor that includes a frame having two generally parallel sides and had originally carried a plurality of rollers at spaced apart locations between the parallel sides into an endless loop belt conveyor, the frame having a head portion and a tail portion, the kit including at least one endless loop belt conveyor guide; and at least two conveyor guide mounts for use as described above. Again, in the alternative, and as the preferred embodiment, the endless loop belt conveyor guides may include two or more adjacent belt conveyor guides. In addition, the conversion kit may include a motor driven roller designed to be dropped in at the head portion or at the tail portion of a frame. Similarly, the conversion kit may include an idler roller designed to be dropped in at the head portion or at the tail portion of the frame.

The method for converting a roller conveyor that had includes a frame having two parallel sides and originally supporting a plurality of rollers at spaced apart locations between the parallel sides along the frame, into an endless loop belt conveyor free of rollers, and when the frame includes a head portion and a tail portion includes several steps. First, usually substantially all of the plurality of rollers originally located between the parallel sides along the frame are removed. Then, at least two conveyor guide mounts are connected between the parallel sides of the substantially roller free frame at spaced apart locations. Each conveyor guide mount including a smooth, substantially non-moving linear upper surface to define a support conveyor bed for guiding an endless loop belt conveyor for movement without rollers. In practice, an endless loop belt conveyor may then be installed around the conveyor frame. Where desired, a motor driven roller may be dropped into the head portion or the tail portion of the conveyor frame. Similarly, an idler roller may be dropped in at the head portion or at the tail portion of the frame.

These and other objects of the present invention will become apparent to those skilled in the art from the following detailed description and accompanying drawings, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings, which are incorporated in and form a part of this specification, illustrate complete preferred embodiments of the present invention according to the best modes presently devised for the practical application of the principles thereof, and in which.

DETAILED DESCRIPTION OF THE PREFERRED EMBODIMENTS

Figure 1:
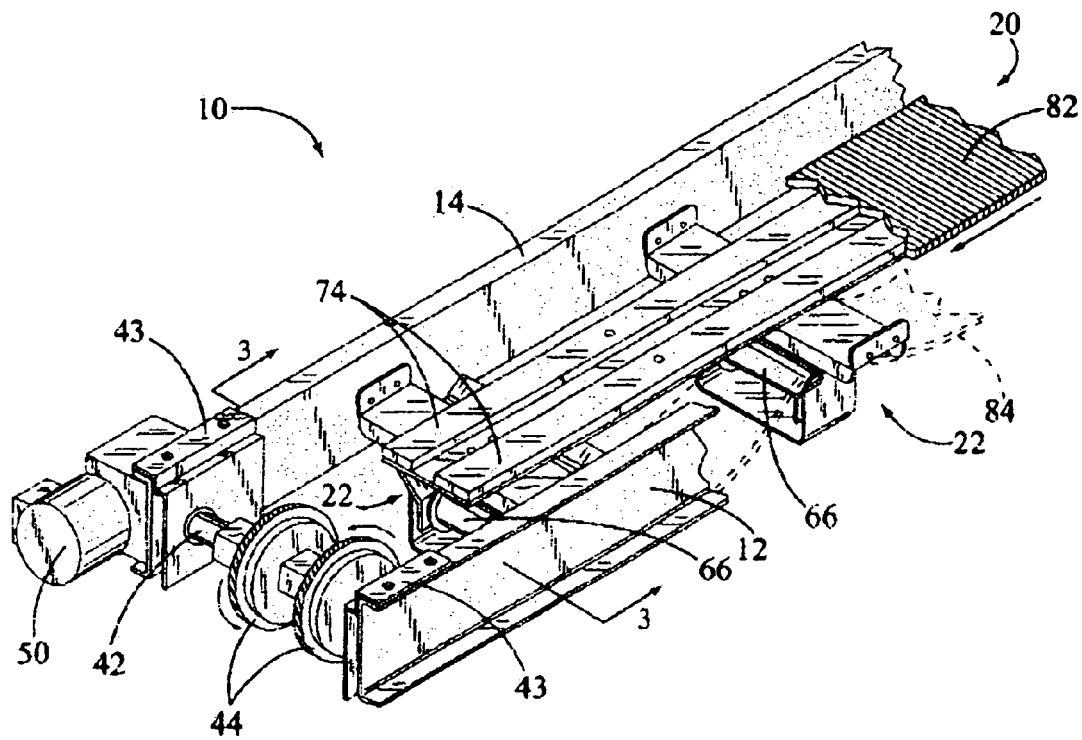
FIG. 1 is a top perspective view, partially cut away illustrating a conveyor system produced using the conversion kit and carrying an endless conveyor belt all in accordance with the present invention.
Figure 2:
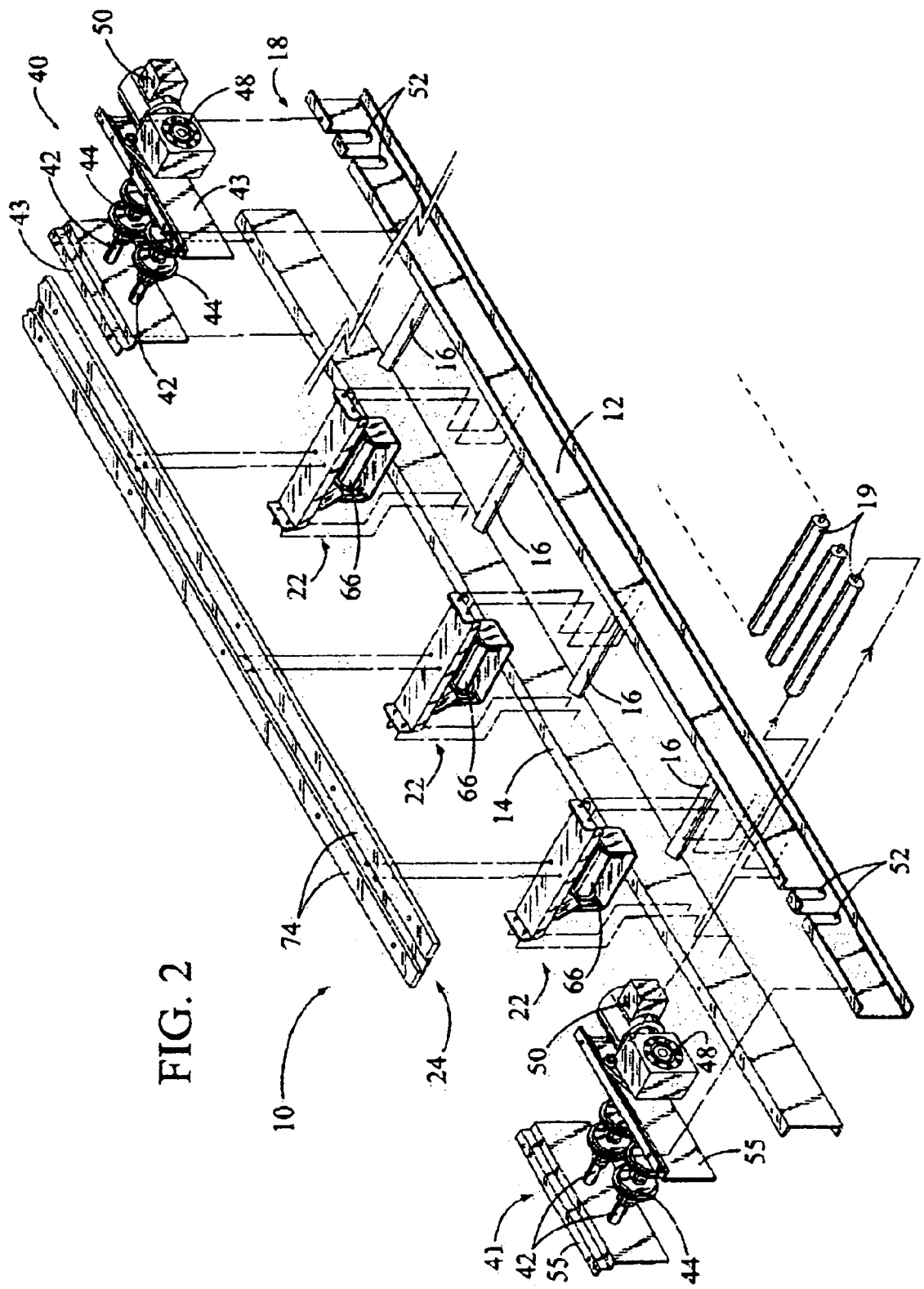
FIG. 2 is an exploded top perspective view illustrating the conveyor produced using the conversion kit in accordance with the present invention, and in which the support rollers have been removed from the frame.

First, referring to FIG. 2, for purposes of orientation an exploded view of a to-be-converted conveyer system, designated generally as 10, is shown according to the present invention. As detailed below, converted conveyer system 10 is to-be converted from a roller conveyor or motor-driven or powered endless belt roller conveyor system, herein collectively referred to as a "roller conveyor". This leaves converted conveyer system 10 with standard roller conveyor elements such as a pair of substantially parallel side beams or walls 12 and 14. In preferred embodiments side beams 12 and 14 are connected at their lower edge portions by a number of spaced apart connector bars 16, thereby forming a rigid frame 18, much as the frame of a standard roller conveyer system. However, in the converted conveyer system 10 of the present invention, substantially all of the rollers 19 have been removed from frame 18, as shown, thereby leaving substantially no rollers 19 carried between parallel side beams 12 and 14 of frame 18. It is noted that there is a given lateral distance between the pair of generally parallel side beams 12 and 14. The lateral distance between beams 12 and 14 is selected to be sufficient to accommodate an endless loop conveyor belt 20, see FIGS. 1 and 5, and the items to be conveyed by conveyor system 10.

Referring again to FIG. 2, the conversion kit of the present invention is shown in exploded relation to frame 18. The conversion kit includes, at a minimum, two or more conveyor belt support and guide mount elements 22 and at least one upper conveyor belt guide support element 24. The upper belt conveyor belt support and guide 24 is preferably made of or coated with a smooth hard polymer; such as acetyl, polyethylene, high density polyethylene, nylon or the like; although wood, ceramic or metal materials may be used for the same purpose. As detailed below, conveyor belt support and guide mount elements 22 extend orthogonally between and are connected to and supported by beams 12 and 14. Conveyor belt guide support element 24 extends in a longitudinal orientation between side beams 12 and 14, but out of contact with beams 12 and 14. In the practice of the present invention two or more conveyor belt support and guide mount support elements 22 are dropped into and connected to side beam 12 and 14 of rigid frame 18 in spaced apart relation by bolts, screws, or any other suitable connecting elements, not shown in detail.

In preferred embodiments each conveyor belt support and guide mount support element 22 includes an upper yoke portion 26 having a lateral width dimension that is substantially the same as the lateral distance between parallel side beams 12 and 14. As noted above, each yoke portion 26 is designed to be connected to and supported by side beams 12 and 14, thereby in turn supporting the rest of the conveyor belt support and guide mount element 22, set forth in greater detail below.

At least one endless loop belt conveyor belt support and guide support element 24 is carried by and attached to the upper yoke portion 26 of at least two adjacent guide support elements 22. Each endless loop belt conveyor belt support and guide includes a substantially smooth, stable, substantially flat non-moving upper surface designed to support and guide an endless loop conveyor belt 21 for movement around converted conveyor system 10 substantially without upper support rollers 19.

Now referring to FIGS. 1, 2 4 and 5, each frame 18 has a head portion, generally 32, and a tail portion, generally 34. As optional, but preferred elements of the conversion kit of the present a motor driven roller section 40 and/or an idler roller section 41 may be included as a part of the conversion kit. In FIG. 2, the motor driven roller section 40 is shown as having an axle 42 rotatably mounted on a pair of opposed plates 43 and dropped in at the head portion 32 of frame 18. Plates 43 are designed to be connected to and supported by side beams 12 and 14. A pair of rollers 44 is connected to axle 42 for rotation with axle 42. A portion of axle 42, not shown, extends through one of the plates 43, as shown, and is connected through slots 52 to clutched by transmission member 48. Motor 50 is operatively connected to transmission member 48, and axles 42 extend. A drive roller section 40 mounted on plates 55 and connected to and supported by the left end of side beams 12 and 14 is also shown in FIG. 2.

As further shown in FIG. 2, idler roller section 41 is comprised, like motor driven section 40 of one or more axle freely rotatably mounted on a pair of opposed plates. Again, like motor driven section 40, one or more roller sprockets is connected to each axle for rotation with each axle. The operation of drive roller section 40 and idler roller section 41 is detailed below. Conventional roller bearings are used with the drive roller section 40 and idler roller section 41 systems as is known in the art.

Figure 3:
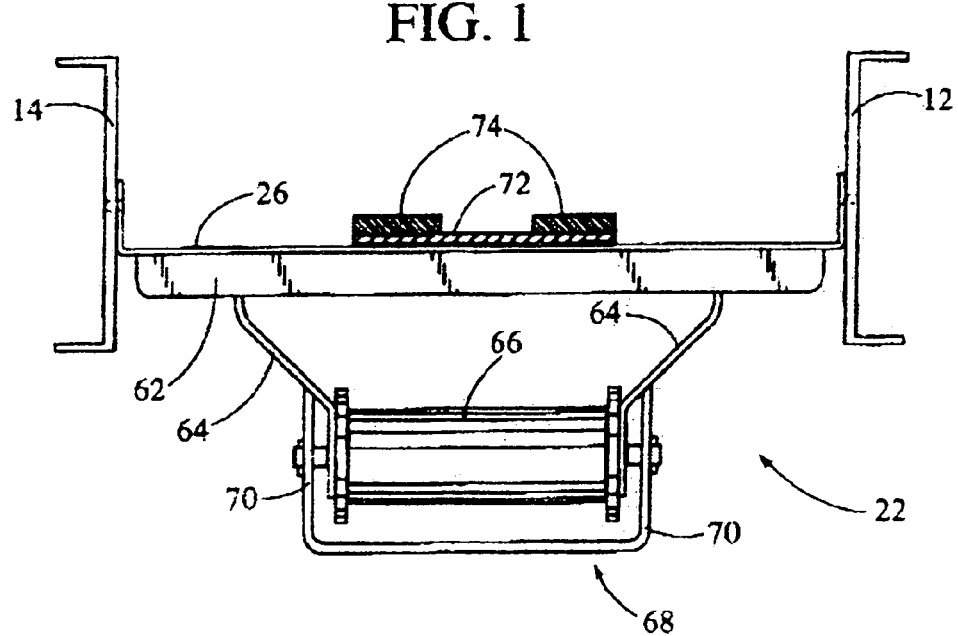
FIG. 3 is an enlarged front elevational view, partially in cross-of a portion of the conveyor conversion kit of the present invention as shown in FIGS. 1 and 2, and illustrating the details of a guide mount carrying a belt conveyor guide and also including a freely rotatable return roller.

Now referring to FIG. 3, guide mount 22 is shown in greater. As shown, guide mount 22 is comprised of a base 62 to which upper yoke 26 is attached by any suitable mechanical or metallurgical mode, although yoke 26 may be integral with base 62. Connected to and depending from base 62 are a pair of opposed, articulated support elements 64. A return roller 66 is freely rotatably supported by each of the opposed articulated supports 64. Depending from and supported by each articulated support 64 is a U-shaped protective casing 68. In this preferred embodiment, the axles of belt return roller 66 also extend through and are rotatably supported by the upwardly extending opposed legs 70 of U-shaped casing 68. As will be appreciated, casing 68 substantially surrounds return roller 66 to provide protection to workers and items in the vicinity of return roller 66 to thereby keep them from getting snagged or pinched by return roller 66.

Also shown in FIG. 3, is a cross-sectional view of belt guide support element 24. In this preferred embodiment belt guide support element 24 includes a support base 72 and a pair of belt supports guide beams 74. As further shown in FIGS. 1–4, endless loop belt conveyor belt support and guide 74 is in the form of two or more laterally adjacent belt conveyor belt support and guide beams 74. Such two or more adjacent belt conveyor belt support and guides beams 74 are preferably substantially linear and longitudinally oriented between side beams 12 and 14. Guides beams 74 have a smooth upper surface and are substantially flat. Any number of belt guide support element 24 may be used in the converted conveyor system, but in preferred embodiments a single continuous belt guide support element 24 is used. The belt guide support element 24 has a lateral width dimension that is less than the lateral distance between parallel side beams 12 and 14 of conveyor frame 18. Furthermore, belt guide support element 24 is stably supported by two or more adjacent belt guide supports elements 22 and is not connected to or supported by side beams 12 and 14.

Figure 4:
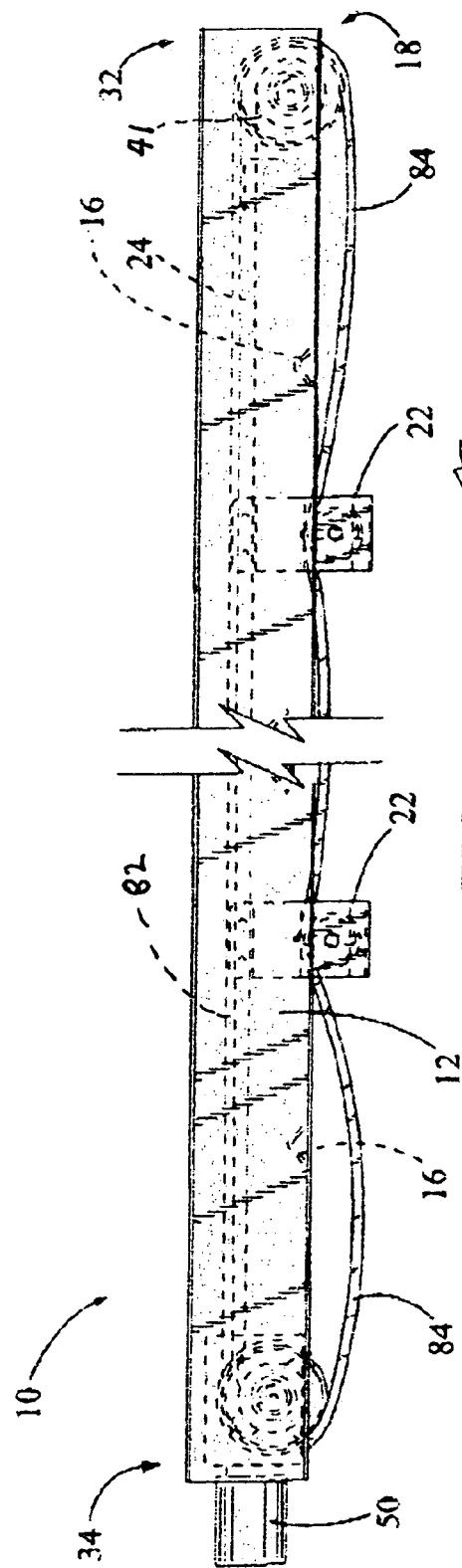
FIG. 4 is a side elevational view of the conveyor system of FIGS. 1 and 2 including the conversion kit of the present invention.
Figure 5:
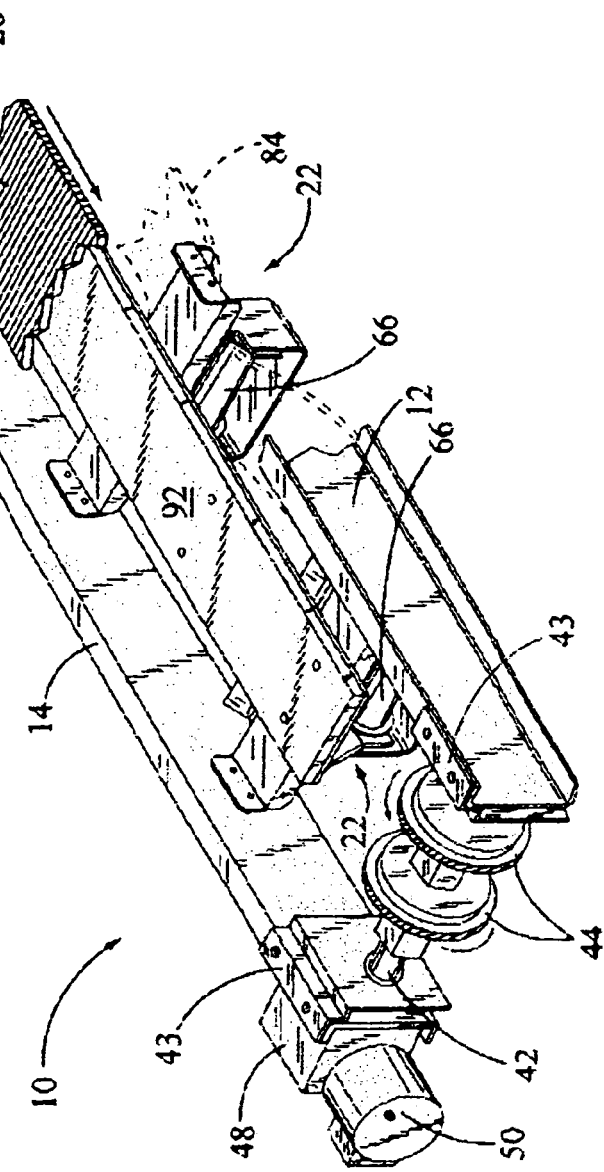
FIG. 5 is a top perspective view, partially cut away, similar to FIG. 1, illustrating a modification of the conveyor system of the present invention.

Belt guide support element 24 supports an upper portion of an endless loop conveyer belt 20, as shown in FIGS. 1 and 5 and in phantom in FIG. 4. The lower or return portion of belt 20 is supported and guided by return roller sprockets 66 as shown in FIG. 4, and in phantom in FIG. 5. In addition, since each endless loop conveyor belt 20 has a consistent upper surface height for transfer to adjacent non-converted conveyor systems having endless loop conveyor belt 20 of the same height without adversely affecting the flow of goods between adjacent conveyor systems. Endless loop conveyor belt 20 is preferably composed of a smooth flexible material that slides easily over the elongated upper surface of belt guide element 24.

As previously noted, in one preferred embodiment of the present invention, motor driven section 40 and idler section 41 are used to replace any existing motor or idler section after they are removed from a roller conveyor. Motor driven roller section 40 and idler section 41 are both designed to be "dropped in" as systems that that are compatible with driven endless loop conveyor belt 20. In practice, the support plates 43 and 55 and axles 42 are pre-aligned so that when they are dropped in to frame 18 they automatically align with one another and with frame 18 without the need to use extensive time or effort to align them.

In one variation of the present invention as shown in FIGS. 1, 4 and 5, return roller section 41 is shown at the head of frame 18 and drive roller section 40 and its associated transmission member 48 and motor 50, are shown at the tail of frame 18. As part of the present invention, it should be understood that once rollers 19 and any original drive system have been removed from frame 18 of a roller conveyor that as a part of the conversion kit and method of the present invention a new drive system section 40 and or return system section 41 can be dropped into either the head or tail portion of frame 18. While not critical to the present invention, the replacement motor driven roller sprocket section 40, endless loop conveyor belt 20, and idler roller sprocket section 41 may have any desired finish, say a standard metallic zinc finish, or virtually any color desired, which thereby can provides the converted system with the appearance of a new system, not a converted system.

It is therefore seen that it is desirable to replace support rollers 19 within a roller conveyor system with a conversion kit 10 including guide support elements 22 supported on a smooth belt guide element 24 having a smooth, elongated upper surface, and motor driven roller sprocket section 40 and idler roller sprocket section 41. Regardless of the elements of the conversion kit that are used, the so converted resulting conveyor system 10 does not have the shortcomings of a state-of-the-art roller conveyor system. The conversion kit of the present invention is of such a nature and such a design that it may be installed by in-house personnel or by a specialty team of independent contractors or from the supplier. It is also to be noted, that when replacing a conveyor roller system its support structure and electrical power grid may remain in place and untouched, thereby providing an economical upgrade using preexisting in place portions.

In the practice of the present invention, a roller conveyor that includes a frame 18 having two parallel side beams 12 and 14, a head or tail portion 32 and a head or tail portion 34, and originally supporting a plurality of rollers 19 may be converted it into the conveyor system of the of the present invention free of rollers 19 in several fast and simple steps. First, substantially all of the plurality of spaced apart rollers 19 originally located between side beams 12 and 14 of frame 18 of a roller conveyor system are removed. Then, at least two guide support mounts 22 are connected between and supported by side beams 12 and 14 of the now substantially roller free frame at spaced apart locations. Then at least one conveyor belt guide element 24 having a smooth, substantially non-moving linear upper surface, in accordance with the teaching of the present invention, is placed longitudinally between parallel beams 12 and 14 to define a support conveyor bed for guiding an endless loop belt conveyor 20 for movement without rollers 19. In practice, an endless loop belt 20 is then installed around the converted conveyor system. Where desired, motor driven roller sprocket section 40 may be dropped into the head or tail portion 32 or the head or tail portion 34 of such a converted conveyor frame. Similarly, idler roller sprocket section 41 may be dropped in at the head or tail portion 34 or at the head or tail portion 32 of frame 18. When activated by motor driven roller sprocket section 40, endless loop conveyor belt 20 slides smoothly along the top of smooth belt guide element 24 without the need for a multiplicity of support rollers 19 below the upper portion of endless loop conveyor belt 20.

It will be understood that a roller free conveyor system, such as that described above as being produced by conversion of a roller conveyor system, may also be produced as original equipment without a conversion.

The conversion kit for power roller conveyor systems of the present invention can be used to convert any and all types of powered roller conveyor system, and to all types of configurations, including, but not limited to straight portions, horizontal runs, inclined and declined portions, curved portions, and spurs. It will be appreciated by referenced to the FIGS. that the resulting converted conveyor system has only about 5% as many moving parts, i.e. 95% less moving parts, as the standard powered roller conveyor system that has been converted, while also concurrently reducing operating noise by about 60%. Concomitantly, such a converted conveyor system requires less maintenance and les of an inventory of spare or replacement parts, thereby again reducing costs. Also, because it requires less maintenance the resulting conveyor system is out of service less often, thereby avoiding the cost of lost production time. Also, when provided as an original system, the cost is only about 60% the cost o a comparable state of the art roller conveyor system.

While a conversion kit for power roller conveyor systems has been shown and described in detail, it is apparent that a conveyor system can be produced in the preferred converted format, but as an original system, without the need to convert a support roller system.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

I claim:

1. An endless loop belt conveyor system having a pair of generally parallel side walls and joined by a series of spaced apart connector bars to form a rigid frame, the parallel side walls of the frame having a distance between them, the conveyor system further comprising:
   at least one endless loop belt conveyor belt support and guide; and
   at least two conveyor belt support and guide mounts, said conveyor belt support and guide mounts supported in spaced apart relation by a pair of generally parallel side walls of a conveyor frame, any said two or more conveyor belt support and guide mounts supporting said at least one endless loop belt conveyor belt support and guide, and wherein
   each said endless loop belt conveyor belt support and guide includes a smooth, non-moving upper surface supporting and guiding an endless loop belt for movement around the conveyor system wherein each said conveyor belt support and guide mount includes an upper yoke portion, said upper yoke portion having a width dimension substantially the same as the distance between the pair of generally parallel side walls of a conveyor frame, said yoke portion connected to and supported by such a pair of generally parallel side walls of a conveyor frame, and wherein each said conveyor belt support and guide mount includes a U-shaped frame connected to and supported by and below said upper yoke portion.

2. An endless loop belt conveyor as in claim 1 wherein said endless loop belt conveyor belt support and guide is substantially linear.

3. An endless loop belt conveyor as in claim 1 wherein said endless loop belt conveyor belt support and guide is substantially flat.

4. An endless loop belt conveyor as in claim 1 wherein said endless loop belt conveyor belt support and guide includes two or more adjacent belt conveyor belt support and guides.

5. An endless loop belt conveyor as in claim 1 wherein said endless loop belt conveyor belt support and guide has a width dimension, said loop belt conveyor belt support and guide width dimension being less than the distance between a pair of generally parallel side walls of a conveyor frame.

6. An endless loop belt conveyor as in claim 5 wherein said endless loop belt conveyor belt support and guide is not connected to the pair of generally parallel side walls of a conveyor frame.

7. An endless loop belt conveyor as in claim 1 wherein each said U-shaped frame portion of said conveyor belt support and guide mount includes a freely rotatable return roller for supporting and guiding the return portion of an endless loop belt.

8. An endless loop belt conveyor as in claim 1 wherein the rigid frame has a head portion and a tail portion.

9. An endless loop belt conveyor as in claim 7 wherein motor driven sprocket roller means is dropped in and attached at the head portion or at the tail portion of the frame, and idler sprocket roller means is dropped in and attached at the opposed tail portion or head portion of the frame.

10. A conversion kit for converting a roller conveyor that includes a frame having two generally parallel side walls into an endless loop belt conveyor, the frame having a head portion and a tail portion, the kit including:
    an endless loop belt conveyor belt support and guide supported by a pair of generally parallel side walls of a conveyor frame; and
    motor driven sprocket roller means dropped in and attached at the head portion or at the tail portion of a conveyor frame wherein said conveyor belt support and guide includes an upper yoke portion, said upper yoke portion having a width dimension substantially the same as the distance between the pair of generally parallel side walls of a conveyor frame, said yoke portion connected to and supported by such a pair of generally parallel side walls of a conveyor frame, and wherein each said conveyor belt support and guide includes a U-shaped frame connected to and supported by and below said upper yoke portion.

11. A conversion kit as in claim 10 wherein said conversion kit includes idler sprocket roller means designed to be dropped in and attached at the head portion or at the tail portion of a conveyor frame.

12. A conversion kit for converting a roller conveyor that includes a frame having two generally parallel side walls into an endless loop belt conveyor, the frame having a head portion and a tail portion, the kit comprising:
    at least one endless loop belt conveyor belt support and guide; and
    at least two conveyor belt support and guide mounts, said conveyor belt support and guide mounts supported in spaced apart relation by a pair of generally parallel side walls of a conveyor frame, any said two or more conveyor belt support and guide mounts supporting said at least one endless loop belt conveyor belt support and guide, and wherein each said endless loop belt conveyor belt support and guide includes a smooth, non-moving upper surface supporting and guiding an endless loop belt for movement around the conveyor system wherein each said conveyor belt support and guide mount includes an upper yoke portion, said upper yoke portion having a width dimension substantially the same as the distance between the pair of generally parallel side walls of a conveyor frame, said yoke portion connected to and supported by such a pair of generally parallel side walls of a conveyor frame, and wherein each said conveyor belt support and guide includes a U-shaped frame connected to and supported by and below said upper yoke portion.

13. A conversion kit as in claim 12 wherein said endless loop belt conveyor belt support and guide is substantially linear and substantially flat.

14. A conversion kit as in claim 12 wherein said endless loop belt endless loop belt conveyor belt support and guide includes two or more adjacent belt conveyor belt support and guides.

15. A conversion kit as in claim 12 wherein said conversion kit includes motor driven sprocket roller means designed to be dropped in and attached at the head portion or at the tail portion of a frame.

16. A conversion kit as in claim 12 wherein said conversion kit includes idler sprocket roller means designed to be dropped in and attached at the head portion or at the tail portion of the frame.

17. A conversion kit as in claim 13 wherein said generally parallel side walls of a conveyor frame have a distance between them, and wherein said endless loop belt conveyor belt support and guide has a width dimension, said loop belt conveyor belt support and guide width dimension being less than the distance between a pair of generally parallel side walls of the conveyor frame with which said endless loop belt conveyor belt support and guide is to be associated, and wherein further said endless loop belt conveyor belt support and guide is not connected to such generally parallel side walls of such a conveyor frame.

18. A conversion kit as in claim 12 wherein said generally parallel side walls of a conveyor frame have distance between them, and wherein each said conveyor belt support and guide mount include an upper yoke portion, said upper yoke portion having a width dimension substantially the same as the distance between a pair of generally parallel side walls of a conveyor frame, said yoke portion connected to and supported by such a pair of generally parallel side walls of a conveyor frame.

19. A conversion kit as in claim 12 wherein each said U-shaped frame includes a freely rotatable return roller for supporting and guiding the return portion of an endless loop conveyor belt placed around the conveyor frame.

20. A conversion kit as in claim 12 wherein the to-be-converted rigid frame has a head portion and a tail portion, motor driven sprocket roller means is provided with the kit to be dropped in and attached at the head portion or tail portion of the frame and idler sprocket roller means is provided with the kit to be dropped in and attached a the opposed tail portion or head portion of the frame.

* * * * *